United States Patent Office 3,414,479
Patented Dec. 3, 1968

3,414,479
PROCESS FOR THE PREPARATION OF
BACTERIAL ALPHA-AMYLASE
Robert A. Wynes and Norman E. Lloyd, Clinton, Iowa, assignors to Standard Brands Incorporated, New York, N.Y., a corporation of Delaware
No Drawing. Continuation-in-part of application Ser. No. 455,009, May 11, 1965. This application Dec. 28, 1967, Ser. No. 694,050
8 Claims. (Cl. 195—66)

ABSTRACT OF THE DISCLOSURE

Yields of alpha-amylase obtained in submerged fermentation of *Bacillus subtilis* may be increased by carrying out the fermentation in a nutrient medium containing an organosilicone copolymer having an inverse solubility coefficient whereby the copolymer is substantially soluble in water at temperatures below normal fermentation temperatures and substantially insoluble in water at fermentation temperatures. A suitable organosilicon copolymer with these solubility characteristics is marketed by Union Carbide Corporation under the trade name L-520. These organosilicon copolymers also act as anti-foaming agents during the production of alpha-amylase.

---

This application is a continuation-in-part of application Ser. No. 455,009, filed May 11, 1965, now abandoned.

This invention relates to the preparation of alpha-amylase by the submerged fermentation of *Bacillus subtilis*.

Typically, in the production of alpha-amylase a nutrient medium containing suitable proportions of water, liquefied starch, corn steepwater, glucose, dried Brewer's yeast and diammonium phosphate is formed, sterilized, cooled, and inoculated with a *Bacillus subtilis* culture. This medium is maintained at fermentation temperatures and is aerated by injecting suitable volumes of sterile air through sparging devices disposed in the medium. The fermentation temperatures are maintained in the range where maximum yields of alpha-amylase are obtained. Typically, such temperatures may be in the range from about 95° to about 100° F.

In large-scale fermentations of nutrient media by means of *Bacillus subtilis* under highly aerated conditions, a persistent foam is likely to be produced. This foam makes further aeration and handling of the medium extremely difficult and results in mechanical loss of the culture fluid. It has long been known in the art that certain surface active agents are effective to prevent or suppress production of foam when incorporated in the nutrient medium. However, such antifoaming agents vary greatly in their effectiveness depending upon the type of fermentation process and the fermentation conditions.

It has been discovered that organosilicon copolymers having an inverse solubility temperature coefficient whereby the copolymer is substantially soluble in water at temperatures below normal fermentation temperatures and substantially insoluble at normal fermentation temperatures are effective antifoaming agents for suppressing foam production in aerated cultures of *Bacillus subtilis*. In addition, the presence of the organosilicon copolymer during the submerged fermentation of *Bacillus subtilis* surprisingly increases the yield of alpha-amylase over that obtained in a comparable submerged fermentation without the presence of the organosilicon copolymers.

Examples of suitable organosilicon copolymers are those derived from copolymerizing propylene oxide and dimethyl silicon. One such organosilicon copolymer is marketed by Union Carbide Corporation under the trade name L-520. L-520 is represented to have a typical viscosity at 100° F. of 700 centistokes and being soluble in ethanol, butanol, acetone and other semipolar organic solvents, but being substantially insoluble in nonpolar organic solvents such as hexane, paraffin oil and polyhydroxy solvents such as ethylene glycol and glycerol.

The organosilicon copolymer of the present invention should be incorporated into the nutrient medium so that before the nutrient medium is substantially fermented the copolymer is dissolved therein. Since all the components of the nutrient should be sterilized before fermentation is begun, it is preferable to incorporate the organosilicon copolymers into the nutrient medium and then sterilized the complete medium before it is inoculated with *Bacillus subtilis*. However, the organosilicon copolymer may be sterilized separately and then added, for instance, at the start of the fermentation procedure so long as the fermentation temperature is lowered to the degree that the organosilicon copolymer dissolves therein. The fermentation temperature may then be raised to the normal temperature required to obtain maximum yields of alpha-amylase. Of course, to obtain maximum yields of alpha-amylase and to provide maximum antifoaming action the organosilicon copolymer should be present at the start of fermentation.

The amount of organosilicon copolymer added to the fermentation medium may vary over a relatively wide range. Concentrations as low as about one part per 20,000 parts of medium and as high as about ten times this amount are effective to increase the yield of alpha-amylase and to provide antifoaming activity. Concentrations in excess of these amounts confer no added advantage and, for obvious economic reasons would not be used. The preferred concentration is about one part per 4,000 parts of medium.

The principal advantage of the present invention is the markedly increased yield of alpha-amylase that is obtained. A further advantage is the lower overall cost for antifoaming agents required per fermentation since L-520 for instance, is effective in minor amounts. Another advantage is that no buildup of oily residue occurs in the fermentation medium compared, for example, to the case where relatively large amounts of other antifoaming agents are used to depress foaming to the same degree. This results in a culture fluid at the end of the fermentation stage which is more readily processed in the subsequent defecation and filtration steps to recover the alpha-amylase. Defecation involves principally the addition of a salt of a divalent cation to coagulate bacteria and other suspended solids in order to obtain a filterable mass.

In order to more clearly disclose the nature of the present invention, a specific example will hereinafter be described. It should be understood, however, that this is done solely by way of example and is intended neither to delineate the scope of the invention nor limit the ambit of the appended claims. In the example and throughout this specification percentages are intended to refer to percent by weight, unless otherwise specified.

In this example alpha-amylase activity was measured in terms of its dextrinizing power on soluble starch using an iodine starch color to denote the end of the dextrinization stage. The activity is expressed in liquefon units. One liquefon unit is equal to 0.35 bacterial amylase unit as defined by the Tentative Method for Assay of Bacterial Amylases, 103–1962T, by the American Association of Textile Chemists and Colorists published in the American Dyestuff Reporter, July 9, 1962.

EXAMPLE

The nutrient medium is prepared, consisting of water, starch liquefied with bacterial alpha-amylase, corn steepwater, glucose, dried Brewer's yeast, diammonium phosphate, and the antifoaming agent. The batch is brought to an approximate volume of 5,600 gallons. The medium is then sterilized and inoculated with a *Bacillus subtilis* culture and the fermentation allowed to proceed at a temperature from about 95° to about 100° F. until the rate of enzyme production has leveled off. Typically, this fermentation requires 38–70 hours. During the fermentation period, the fermentation medium is aerated by injecting suitable volumes of sterile air through sparging devices in the fermentor, and is agitated by means of mechanical agitators. During this period, sufficient amounts of Hodag KG, an antifoaming agent manufactured by Hodag Chemical Company, is added as required, for instance, by means of an automatic system which is actuated whenever the foam level builds up to a predetermined point in the fermentor.

The following table shows the effects of different kinds of antifoaming agents on alpha-amylase production.

| No. of fermentations | Antifoam added to nutrient media | Billions of liquefon units per fermentation |
| --- | --- | --- |
| 76 | None | 74.1 |
| 23 | 60 qts. Hodag KG | 89.3 |
| 2 | 20 qts. SAG 470 | 65.5 |
| 2 | 2 qts. L-520 | 90.0 |
| 3 | 3 qts. L-520 | 118.5 |
| 3 | 4 qts. L-520 | 115.7 |
| 36 | 5 qts. L-520 | 113.7 |
| 14 | 6 qts. L-520 | 111.2 |
| 15 | 7 qts. L-520 | 118.7 |

All fermentations were comparable in respect to concentration and volume. When no antifoaming agent was added to the medium before sterilization, the yield of alpha-amylase at the end of the fermentation period in the fermentation culture averaged 74 billion liquefon units. When 15 gallons of Hodag KG, a material manufactured by Hodag Chemical Company, was added before sterilization, the resulting yield increased by 20 percent. Five gallons of SAG–470, manufactured by Union Carbide Corporation, gave an overall 12 percent decrease in yield. On the other hand, when as little as 2 quarts of L–520 was used, the yield increased by 22 percent. Thus, a relatively small amount of L–520 was more effective than 30 times as much Hodag. Further, increasing the amount of L–520 to the range of 3–7 quarts conferred an additional 23 percent increase in yield for a total increase of 55 percent over the system to which no antifoaming agent had been added before sterilization.

The terms and descriptions which have been employed are used as terms of description and not of limitation, and it is not intended, in the use of such terms and expressions, to exclude any equivalents of the features shown and described or portions thereof, since it is recognized that various modifications are possible within the scope of the invention claimed.

What is claimed is:

1. In a process for the production of alpha-amylase by the submerged fermentation of a nutrient medium by means of *Bacillus subtilis* under aerobic conditions, the improvement which comprises carrying out the fermentation in the presence of an amount of an organosilicon copolymer effective to increase the yield of alpha-amylase, the organosilicon copolymer being characterized as having an inverse solubility temperature coefficient whereby the copolymer is substantially soluble in water at temperatures below normal fermentation temperatures and substantially insoluble in water at normal fermentation temperatures.

2. A process as defined in claim 1, wherein the organosilicon copolymer has been provided in the nutrient medium by adding it to the nutrient medium maintained at a temperature below normal fermentation temperatures.

3. A process as defined in claim 2, wherein the organosilicon copolymer is derived from copolymerizing propylene oxide and dimethyl silicon.

4. A process as defined in claim 3, wherein the organosilicon copolymer is known as L–520 and is characterized as having a typical viscosity at 100° F. of 700 centistokes and is soluble in ethanol, butanol, acetone and other semipolar organic solvents and substantially insoluble in hexane, paraffin oil, ethylene glycol and glycerol.

5. A process as defined in claim 4, wherein the amount of L–520 is in the range of one part to ten parts per 20,000 parts of nutrient medium.

6. A process as defined in claim 5, wherein the amount of L–520 is about one part per 4,000 parts of nutrient medium.

7. The process as defined in claim 6, wherein the nutrient medium comprises water, starch liquefied with bacterial alpha-amylase, corn steepwater, glucose, dried Brewer's yeast and diammonium phosphate.

8. The process as defined in claim 1, wherein the fermentation temperature is between about 95° and about 100° F. and the time in which the fermentation is carried out is from about 38 to about 70 hours.

References Cited

UNITED STATES PATENTS

| | | | |
| --- | --- | --- | --- |
| 2,523,245 | 9/1950 | Coppock | 195—107 |
| 2,698,843 | 1/1955 | Haskins | 195—107 X |
| 2,821,501 | 1/1958 | Simpson | 195—66 X |
| 3,164,533 | 1/1965 | Kronish | 195—96 |
| 3,271,267 | 9/1966 | Weber et al. | 195—31 |
| 3,272,717 | 9/1966 | Fukumoto et al. | 195—68 |

LIONEL M. SHAPIRO, *Primary Examiner.*